Patented May 16, 1950

2,507,864

UNITED STATES PATENT OFFICE 2,507,864

POLYMERIZATION OF OLEFINS

Frank J. Moore and Meredith M. Stewart, Wappingers Falls, N. Y., assignors to The Texas Company, New York, N. Y., a corporation of Delaware No Drawing. Application March 25, 1947, Serial No. 737,090

2 Claims. (Cl. 260—683.15)

This invention relates to catalytic polymerization of olefins.

The invention contemplates a method of polymerizing olefinic hydrocarbons which comprises passing the hydrocarbons in contact with a solid catalyst comprising an acid treated zeolite type of synthetic gel having the approximate composition $Na_2O \cdot Al_2O_3 \cdot 5SiO_2$ (before acid treatment), and effecting such contact under polymerizing conditions.

The invention has particular application to polymerizing a normally gaseous olefin such as propylene to produce propylene dimer. Treatment of the propylene feed hydrocarbons is advantageously effected at a temperature in the range about 500 to 700° F. and under pressures ranging from about 150 to 500 pounds per square inch gauge, employing hydrocarbon space velocities in the range about 300 to 1000 gaseous volumes of hydrocarbon (measured under standard conditions), per volume of catalyst per hour. Preferably the polymerizing action is effected in the presence of added hydrogen, the hydrogen being charged at the rate of about 100 to 500 cubic feet per barrel of liquified feed hydrocarbon.

Advantageously the catalyst contains a small amount of metal oxide, preferably nickel oxide. The nickel oxide may amount to from 1 to 10% and preferably about 1 to 2% by weight of the acid treated gel.

The synthetic gel of the foregoing composition is acid treated to reduce the sodium content without reducing or substantially reducing, the aluminum oxide content. Acetic acid is a preferred treating agent, although dilute mineral acids, such as dilute hydrochloric acid, may also be used.

An effective polymerizing catalyst is prepared by allowing the synthetic gel of the foregoing composition, in solid granular form (about 6 to 10 mesh) to stand for about one-half hour in a dilute solution of acetic acid, the solution containing about 1% acetic acid. The dilute acid may be in the proportion of about 5 liters to 2½ kilograms of the gel. After standing for the required time, the supernatant liquid is drawn off and the treated gel washed at least several times with dilute acid. Following the final wash with about 5 liters of pure water, the gel is dried and calcined at 1000° F. for six hours. The resulting gel contains less than about $\frac{1}{10}$% alkali computed at $Na_2O$, and is therefore substantially sodium-free. When it is desired to incorporate the nickel oxide in the catalyst the acid treated gel may be treated with about equal parts by weight of a nickel nitrate solution containing about 5% of $Ni(NO_3)_3 \cdot 6H_2O$, and thereafter dried and calcined.

In the following examples, the catalyst was used to convert propylene into a product rich in propylene dimer. In each case a stream of propylene and propane containing about 45 to 47 mol per-cent propylene was passed in gas phase through a stationary mass of solid catalyst at a temperature of about 600° F. and under a pressure of about 200 pounds, using a hydrocarbon space velocity of about 460 to 470 volumes of hydrocarbon per volume of catalyst per hour.

The contact was also effected in runs A and B, in the presence of added hydrogen, the hydrogen being charged at the rate of about 300 to 320 cubic feet per barrel of liquified charge. No hydrogen was added in run C.

In run A, the catalyst consisted solely of the solid acid treated gel while in runs B and C, the catalyst consisted of the acid treated gel containing 1% nickel oxide by weight. The yields of resulting polymer product and compositions thereof were as follows:

| Run | A | B | C |
|---|---|---|---|
| Weight percent Polymer Basis $C_3H_6$ Feed | 37.6 | 43.2 | 25.2 |
| Polymer Composition: | | | |
| $C_6$ | 44.3 | 46.0 | 53.6 |
| $C_7$ | 11.9 | 10.5 | 8.2 |
| $C_8$ | 9.4 | 7.5 | 7.5 |
| $C_9$ | 17.1 | 18.7 | 16.7 |
| Residue | 17.3 | 17.3 | 14.0 |

As indicated by runs A and B in the foregoing table, the presence of a small amount of nickel oxide in the catalyst resulted in an increased yield of polymer product, the resulting product containing an increased amount of the dimer. Experience seems to indicate that the nickel oxide is superior to other metal oxides from the standpoint of producing an increased yield of polymer product. It also appears that use of a nickel oxide-gel catalyst permits increasing the reaction pressure substantially so as to obtain an increased yield of polymer product without appreciably decreasing the volatility of the polymer product. This result is unexpected, inasmuch as experience indicates that, with increasing pressure, volatility of the product usually decreases. Pressures in the range 300 to 500 pounds can be used.

Comparing run C with runs A and B, it is evident that the presence of added hydrogen is advantageous from the standpoint of obtaining an increased yield of polymer.

The foregoing polymer product yields obtained with the catalyst of this invention are superior to those obtained with other alumina silica gel type catalysts. For example, when treating a similar $C_3$ feed mixture under substantially similar conditions with a solid catalyst containing about 2% alumina, 90% silica and about 8% zirconia, a polymer yield of less than 30% was obtained.

While propylene has been specifically referred to in the examples, nevertheless, it is contemplated that the invention is useful in treating other olefinic hydrocarbons or mixtures thereof including normally gaseous and normally liquid olefins. Operating conditions may be varied from those specifically mentioned depending upon the particular hydrocarbon mixture undergoing treatment as well as upon the nature of the product desired. Furthermore, the catalyst may be used in the form of a fluidized mass or in the form of a moving bed.

It is contemplated that the catalyst may be used in other than granular form. Thus, it may be employed in the form of pellets or in any other suitable form.

Obviously, many modifications and variations of the invention, as hereinbefore set forth, may be made without departing from the spirit and scope thereof, and therefore only such limitations should be imposed as are indicated in the appended claims.

We claim:

1. In the catalytic polymerization of a $C_3$ olefin, the method comprising passing said olefin in contact in a reaction zone with a solid granular catalyst comprising a synthetic gel of the acid treated zeolite type having the approximate composition $Al_2O_3.5SiO_2$, substantially free from alkali metal and containing a small amount of nickel oxide, effecting said contact under polymerizing conditions at a temperature in the range about 500 to 700° F., under a pressure in the range about 150 to 500 p. s. i. g. and in the presence of added hydrogen amounting to from about 100 to 500 cu. ft. per barrel of feed hydrocarbon (measured as liquid), maintaining a feed hydrocarbon space velocity through the reaction zone in the range about 300 to 1,000 volumes of hydrocarbons (measured under standard conditions) per volume of catalyst per hour, thereby obtaining a polymer product containing dimer as the predominant constituent, the yield of said polymer product basis olefin feed being substantially in excess of that obtained by effecting the polymerization in the absence of said added hydrogen.

2. In the method according to claim 1 in which the nickel oxide content of the catalyst amounts to from about 1 to 10% by weight of said gel.

FRANK J. MOORE.
MEREDITH M. STEWART.

REFERENCES CITED

The following references are of record in the file of this patent:

UNITED STATES PATENTS

| Number | Name | Date |
|---|---|---|
| 1,988,112 | Egloff | Jan. 15, 1935 |
| 2,068,016 | Gayer | Jan. 19, 1937 |
| 2,273,038 | Houdry et al. | Feb. 17, 1942 |
| 2,332,276 | Stahly | Oct. 19, 1943 |
| 2,398,899 | Teter | Apr. 23, 1946 |
| 2,438,560 | Kanhofer | Mar. 30, 1948 |
| 2,439,021 | Quigg | Apr. 6, 1948 |